J. T. HARCARIK.
SPRAG REMOVER AND RETAINER.
APPLICATION FILED SEPT. 29, 1909.
943,538.
Patented Dec. 14, 1909.
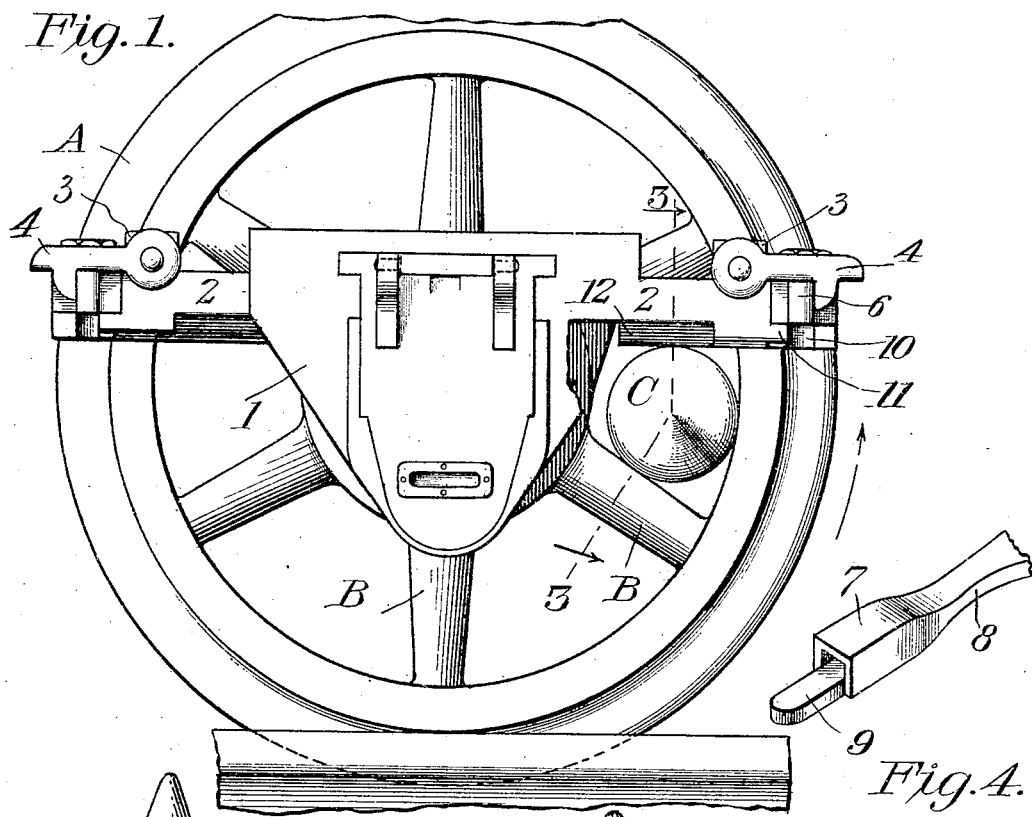
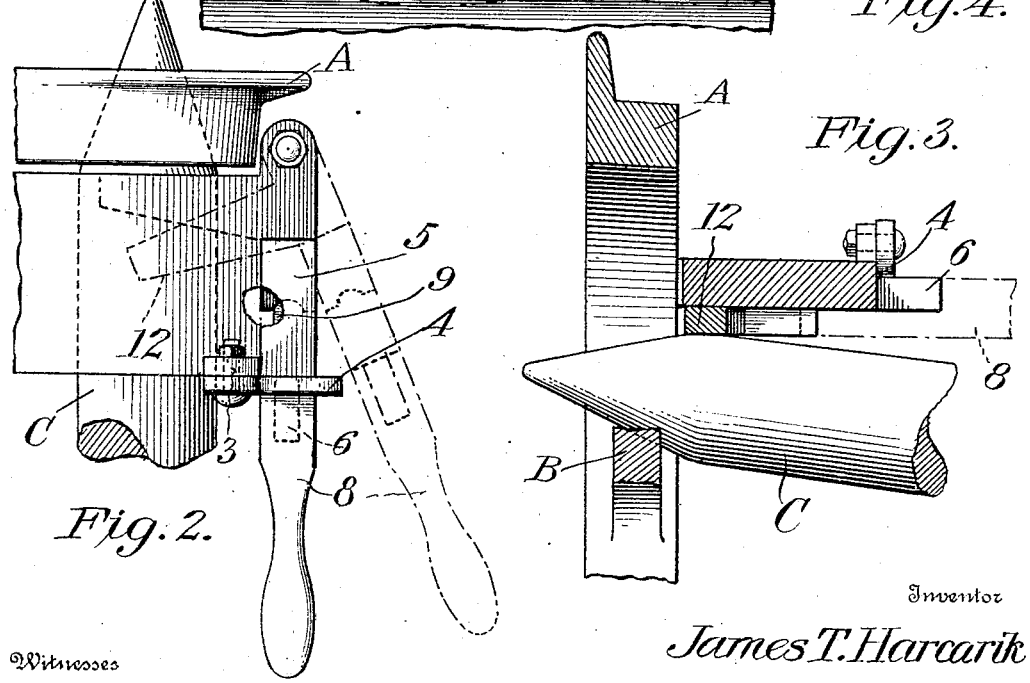
Witnesses
Fenton S. Belt
James A. Koehl
Inventor
James T. Harcarik
By Victor J. Evans
Attorney

UNITED STATES PATENT OFFICE.

JAMES THOMAS HARCARIK, OF WILKES-BARRE, PENNSYLVANIA.

SPRAG REMOVER AND RETAINER.

943,538. Specification of Letters Patent. Patented Dec. 14, 1909.

Application filed September 29, 1909. Serial No. 520,192.

*To all whom it may concern:*

Be it known that I, JAMES THOMAS HAR-CARIK, a subject of the Emperor of Austria-Hungary, residing at Wilkes-Barre, in the county of Luzerne and State of Pennsylvania, have invented new and useful Improvements in Sprag Removers and Retainers, of which the following is a specification.

This invention relates to sprag removers and retainers for mine cars or similar rolling stock, and an object of the invention is to provide novel, simple and effective means which may be applied to the journal boxes of a car and arranged with respect to the wheels thereof to engage the sprag when the latter is inserted between the spokes of the wheel and a portion of the said journal box respectively, the said means serving to normally prevent removal of the said sprag but being arranged for convenient operation whereby the sprag may be easily withdrawn or removed.

The above mentioned and other objects are attained by the construction, combinations and arrangements of parts, as disclosed on the drawing, set forth in this specification, and particularly pointed out in the appended claims.

In the drawing, forming a portion of this specification and in which like characters of reference indicate similar parts in the several views:—Figure 1 is a detail side elevation of a car wheel and its journal box showing my improved sprag remover and retainer applied thereto and showing a sprag operatively positioned between one of the spokes of the wheel and a portion of the said journal box. Fig. 2 is a detail top plan view of a portion of the wheel and journal box. Fig. 3 is a detail section taken on the line 3—3 of Fig. 1. Fig. 4 is a detail perspective view of the operating handle.

The wheel A shown in the drawing is of the type generally employed in mine cars, and as illustrated, the said wheel is provided with a series of spokes B which radiate from the hub in the usual manner. The axle of the wheel herein illustrated is mounted in a journal box 1 upon which is mounted a pair of oppositely extending brackets 2. Each bracket is identical in construction and it is thought that the description of one will suffice for both, hence it may be mentioned that the bracket 2 upon the right of the journal box is provided with an upstanding lug 3 upon which is pivotally mounted a latch 4. A lever 5 is pivoted upon the journal box at a point adjacent to the said latch and is adapted for horizontal swinging movement. This lever is formed with a reduced end portion 6 with which is adapted to be engaged the socket head 7 of an operating handle 8. The operating handle is provided with an outwardly extending tongue 9 which is adapted to be inserted in the groove 10 of the lever 5, this construction being provided for the purpose of forming a strong and substantial connection so as to facilitate the operation of the lever. Adjacent to the latch 4 the bracket 2 of the journal box supports a shoulder 11 upon which a portion of the lever is adapted to rest to relieve the same of strain as will be appreciated.

The lever 5 just described is formed with a retaining member or arm 12 which extends at a right angle to the lever and is adapted when the latter is operated to be moved directly beneath the bracket 2 to assume a position in parallel relation thereto and to lie in juxtaposition to the wheel A. A sprag C when operatively positioned between the spokes of the wheel will be moved in rotation of the latter to lie against the retainer 12 of the lever 5 when the same is moved into its operative position. Assuming the wheel A to be revolving in the direction of the arrow shown in Fig. 1, it will be obvious that the tendency will be to force the sprag into frictional engagement with the arm 12 of the operating lever which will wedge the sprag between one of the spokes B and the said arm 12 of the lever to hold the sprag against casual displacement. When the sprag is thus positioned it will be understood that the wheel A will be held against rotation and will be fixed to slide upon the track upon which it is mounted. When it is desired to free the wheel or in other words to permit the same to revolve the lever is actuated to move the arm 12 thereof out of frictional engagement with the sprag whereupon the latter will be free for convenient removal.

I claim:

1. The combination with a journal box and a wheel revolubly mounted thereupon, of a removable sprag adapted to be inserted between the spokes of the wheel and journal box respectively, and a member mounted upon the said journal box and adapted for frictional engagement with the said sprag to hold the same against removal.

2. The combination with a journal box and revoluble wheel therefor, of a removable sprag adapted to be inserted between the spokes of the wheel, and means upon the journal box adapted to be engaged with the sprag to hold the same against removal.

3. The combination with a journal box and wheel revolubly mounted upon the said box, of a removable sprag adapted to be inserted between the spokes of the wheel, a lever upon the journal box, and means upon the lever adapted to be engaged with the sprag to hold the same against removal to prevent rotation of the said wheel.

4. The combination with a wheel and a journal box for revolubly supporting the same, of removable means adapted to be inserted between the spokes of the wheel, and means for coöperation with the first named means to hold the same against removal.

5. The combination with a journal box and a revoluble wheel therefor, of a removable sprag adapted to be engaged with the wheel to hold the same against rotation, and means upon the journal box adapted to be engaged with the sprag to hold the same against removal.

6. A journal box having a bracket extending therefrom, a wheel revolubly mounted upon the said box, a sprag adapted to be inserted between the spokes of the wheel, a pivoted lever upon the bracket, means upon the lever adapted to be engaged with the sprag to hold the same against removal, and a latch upon the bracket adapted to be engaged with the said lever to hold the same against pivotal movement.

In testimony whereof I affix my signature in presence of two witnesses.

JAMES THOMAS HARCARIK.

Witnesses:
JOHN H. BOSACK,
MICHAEL J. YURKANIN.